O. O. Storle.
Horse-Hay-Fork.

Nº 84017  Patented Nov. 10, 1868.

Witnesses

Inventor

O. O. Storle

OLE O. STORLE, OF NORWAY, ASSIGNOR TO HIMSELF AND J. B. SMITH, OF MILWAUKEE, WISCONSIN.

*Letters Patent No. 84,017, dated November 10, 1868.*

IMPROVEMENT IN HORSE HAY-FORKS.

The Schedule referred to in these Letters Patent and making part of the same.

*To all whom it may concern:*

Be it known that I, OLE O. STORLE, of the town of Norway, in the county of Racine, and State of Wisconsin, have invented a new and useful Improvement in Horse Hay-Forks; and I do hereby declare that the following is a full, clear, and exact description thereof, which will enable those skilled in the art to make and use the same, reference being had to the accompanying drawing, forming part of this specification, in which—

Figure 1:
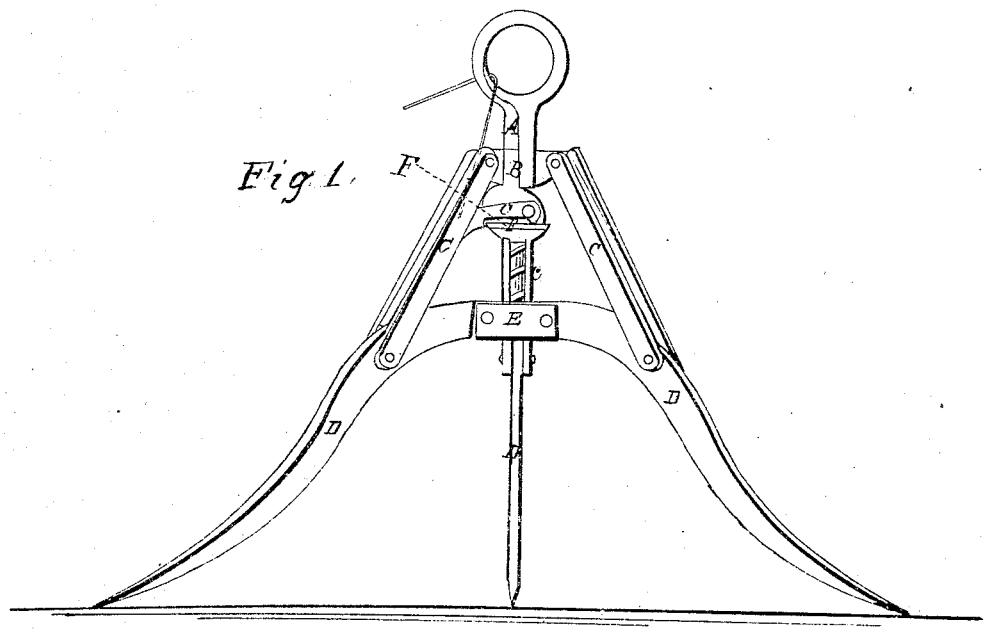
Figure 2:

Figure 1 is a view of the fork, open;

Figure 2, a view of the face-side of the lock-nut; and

Figure 3:
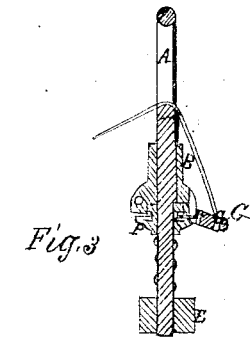

Figure 3, a sectional view of the lock.

Similar letters of reference in each of the figures indicate corresponding parts.

The object of my invention is to produce a fork which shall lock at any point, and be released easily and with certainty, and which can be used with facility.

A is the main shaft, with a screw on its lower end.

B, slide and lock.

C, side-connections, which connect the slide B to the tines.

D, tines.

E, lower castings, which secure the ends of the tines to the main shaft A.

F, revolving lock, which slides on the main shaft. This lock has a female screw, which fits on the screw on the main shaft A, and is turned out at the upper end, so as to fit in a recess in slide B.

G, trigger, which is fastened at one end to slide B, and the other end hangs loose, and has a notch on it, which catches in lock F, and holds the lock at any point. In the end of this trigger is a small rope, which passes up through the ring in the main shaft, to operate it with.

Operation.

Shove the fork down into the hay, and the curve of the tines will cause them to spread, and the lock F will run up the main shaft, and the notch in the trigger G will fall into the notches, and hold it at any point.

When the hay is raised to the desired position, pull on the rope attached to the trigger, which will raise the notch out of the notch or teeth in the lock F, and the weight of the hay will cause the tines to fall, and the hay will drop off.

I do not desire to secure anything in relation to the tines, braces, &c., for they are combined in my fork, patented April 23, 1867; but What I do claim as my invention, and desire to secure by Letters Patent, is—

The parts B, F, and G, in combination with the screw on shaft A, substantially as described.

OLE O. STORLE.

Witnesses:
J. B. SMITH,
JAMES LUDINGTON.